Feb. 17, 1959     K. G. C. SAVKE     2,873,993
BUMPER STRUCTURE
Filed June 10, 1955
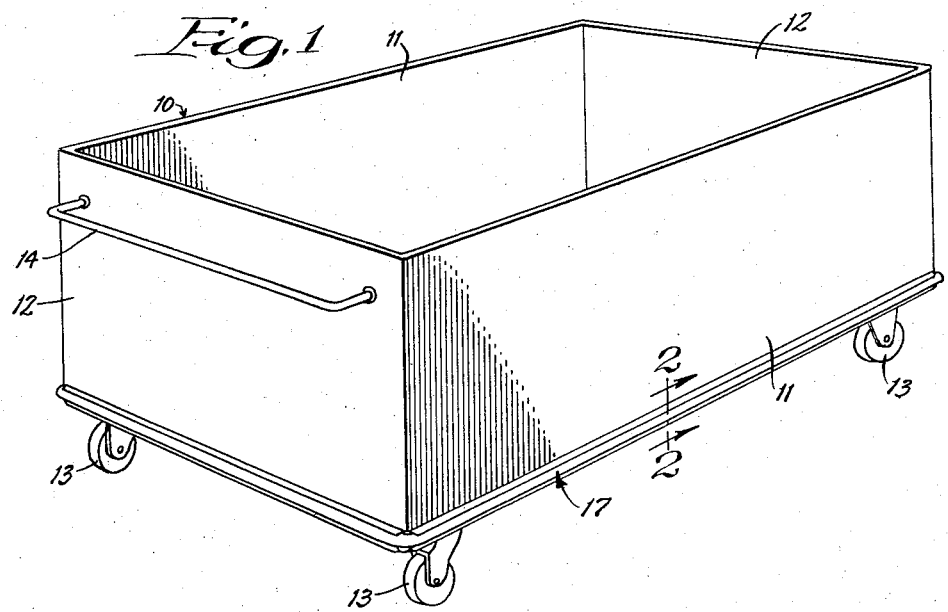
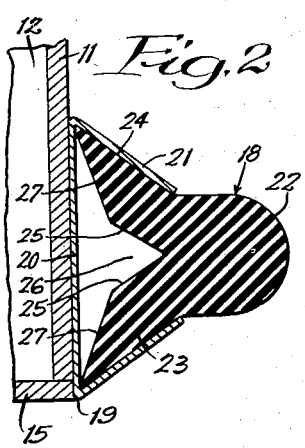
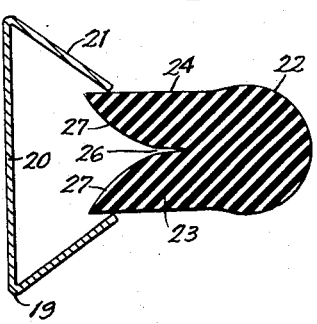
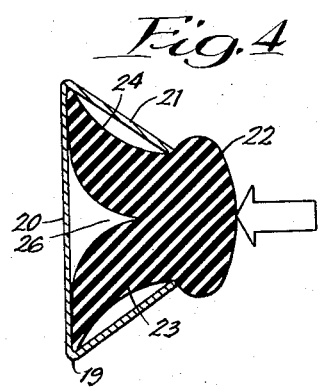
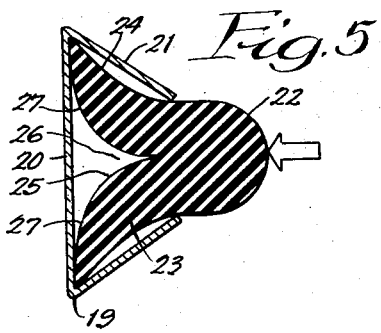
INVENTOR.
Kurt G. C. Savke,
BY
Dawson, Tilton & Graham,
ATTORNEYS.

United States Patent Office 2,873,993
Patented Feb. 17, 1959

2,873,993
BUMPER STRUCTURE

Kurt G. C. Savke, Cincinnati, Ohio, assignor to American Hospital Supply Corporation, Evanston, Ill., a corporation of Illinois Application June 10, 1955, Serial No. 514,612

8 Claims. (Cl. 293—62)

This invention relates to bumper structures, and more specifically to a structure having a resilient member which is particularly useful as a bumper guard for push-carts, trucks and the like.

Resilient bumper guards are frequently used upon movable units, such as wagons, trucks and carts, to protect fixed objects with which these movable units might contact or collide, such as doorway moldings, furniture, etc. from gashes or dents. It has been necessary in the past to provide the movable units with bumper guards which are resilient, but which are also firm enough to withstand sharp impacts. An inherent disadvantage of such bumper guards has been the fact that these bumpers fail to provide a gentle cushioning effect when the carts upon which they are mounted are urged against relatively light-weight objects, such as tables, and particularly where easily breakable equipment has been placed thereon. This shortcoming of present bumper structures is especially apparent in hospitals and clinics, where even gentle contact of such carts with stands and tables is likely to produce breakage of delicate apparatus arranged upon the table surfaces.

Another disadvantage of present bumper structures resides in the difficulty of mounting the resilient members upon the movable unit, and hence the difficulty of replacing such members when that is necessary.

Therefore, one of the main objects of the present invention is to provide a bumper structure adapted to yield upon gentle contact with foreign objects, and also equipped to withstand severe impact with such objects. Another object of the present invention is to provide a bumper structure having a resilient member which is easily replaceable, and which is frictionally secured in operative position.

An additional object is to provide a bumper having a generally double V-shaped cross-section, the diverging legs of said bumper being adapted to bend or flex inwardly in response to a force applied to the head of the bumper.

A further object is to provide a bumper structure having a generally V-shaped resilient member equipped with a head portion and a pair of normally spread-apart legs having bottom surfaces angularly engaging the base of a channel, the legs also defining a notch centrally therebetween, so that when the head portion is pressed toward the channel the legs yield and the angles between the channel base and bottom surfaces of the legs are reduced. A still further object resides in the provision of a bumper structure which includes a V-shaped resilient member having a head and having outwardly extending legs, the legs normally providing a V-shaped groove therebetween, and another V-shaped groove being completely defined by the bottom surfaces of the legs when the legs are flexed towards each other. Other objects will appear from the specification and drawings, in which—

Figure 1 is a perspective view of a truck equipped with the bumper structure of the present invention; Figure 2 is a cross-sectional view of the bumper structure taken along line 2—2 of Figure 1; Figure 3 is similar to Figure 2, but shows the resilient member folded for insertion within a channel member; and Figures 4 and 5 are cross-sectional views like Figures 1 and 2, but illustrate the bumper being compressed by forces of different magnitudes.

Referring to the drawings, Figure 1 shows a typical truck 10 equipped with side and end panels 11 and 12 respectively and wheel units 13. At least one of the panels may be supplied with a handle so that the truck may be either pushed or pulled by an operator. The construction of the truck is entirely conventional except for the bumper structure to be presently described.

Along the side and end panels and adjacent the bottom panel 15 of the truck extends a continuous bumper or guard structure 17. In the cross-sectional view of Figure 2, this structure is shown to consist of an elongated resilient member 18 held in operable position by an elongated channel member 19. While I have found that a metal such as steel is particularly suitable as a material for fabricating the channel member, I appreciate the fact that plastic materials which possess the necessary qualities of strength and ridigity might also be used.

As shown in Figure 2, the channel has a generally U-shaped cross-section and is provided with a base wall 20 and converging side walls 21. The U-shaped channel member is turned on its side so that the walls 21 are directed forwardly and inwardly towards each other. I prefer to weld the channel member upon the side and end panels of the truck, although any other suitable attaching means such as riveting or bolting may be used.

The resilient member or bumper 18 has a cross section generally in the form of the letter V. A head portion 22 is equipped with outwardly and rearwardly diverging legs 23 which are preferably formed integrally therewith. The bumper 18 may be molded or otherwise fashioned from a number of resilient materials, such as rubber or rubber-like compositions.

When the V-shaped member or bumper 18 is mounted and in uncompressed condition, it assumes the configuration shown in Figure 2. The outer surfaces 24 of legs 23 frictionally engage the inner surfaces of channel walls 21 and secure the member 18 in operable position. The legs 23 also have inner surfaces 25 defining a V-shaped groove or notch 26 centrally therebetween. From the most rearward or broadest portion of the notch defined by walls 25, the legs then taper and terminate adjacent the corners of the channel formed by the juncture of side walls 21 and base 20.

It is to be noted that in normal or unflexed condition, the bottom surfaces 27 of legs 23 do not contact the base of the channel except at the extreme ends of each of the legs. As best seen in Figure 2, the bottom surfaces 27 of the legs lie along intersecting planes normally forming acute angles with the base of the channel. These planes also form obtuse angles with the intersecting planes passing along the inner surfaces 25 of the legs.

In securing the resilient member 18 to the channel member 19, the legs 23 are flexed or folded inwardly towards each other until the outer surfaces of the legs are parallel, and are then inserted through the opening provided between the side walls 19. This operation is shown best in Figure 3. When the legs are thus in folded condition, the inner walls 25 of the legs are in contiguous relation, and the notch 26 which is normally present when the bumper is uncompressed is no longer distinguishable. However, the V-shaped groove defined by the planes passing along the bottom surfaces 27 of the legs, remains even when the legs are folded although the angle created by the intersection of these planes is thereby made more acute. After the resilient legs are fully inserted through the opening provided by channel walls 21, they expand and frictionally engage those side walls. Therefore, the resilient bumper 18 is held in the operative position shown in Figure 1 without the need for anchoring screws or other securing means commonly found in present structures.

The head of the bumper normally extends forwardly beyond the side walls of the channel member, and is rounded along its most forward portion to provide a suitable bumping surface. Therefore, when the truck 10 is guided towards another surface, such as a wall, the projecting head of the bumper is poised for making initial contact with the wall and cushioning the impact therewith.

Upon impact between head 22 and a foreign object or surface, the portions of legs 23 adjacent notch 26 flex inwardly toward each other and rearwardly towards base 20. As a result, the angles formed between the surfaces of leg bottoms 27 and the base 20 are reduced as the bottom surfaces are brought into contact with the base.

Therefore, when a force is exerted against the bumper head 22, the legs, which are more resilient than the head portion because of their reduced dimensions, are the first portions of the bumper to respond. Of particular significance in this respect is the taper of each of the legs since the narrow portions of the legs near the base 20 are especially responsive to even slight impacts against head 22.

It is believed evident, therefore, that the structure of the present invention is extremely adaptable in responding most suitably to impacts of varying magnitudes. If a force against bumper head 22 is slight, as where truck 10 is gently urged against an object such as a table, the bumper head will tend to slide rearwardly within the opening defined by walls 21 and the legs of member 18 will flex inwardly and rearwardly to provide a cushioning effect. This condition is represented by Figure 5. However, if the force against the head persists, or if it is initially of severe magnitude, then the flexing of the legs will be followed by distortion of the head itself so that greater resistance to the force will be supplied, as indicated in Figure 4. Thus, the present bumper structure is resilient enough to protect delicate or easily-upsetable objects where the impact therewith is slight, and at the same time provides a firm response and maximum protection in the case of forceful impacts with fixed objects.

While the drawings and foregoing specifications has set forth my invention in considerable detail for purposes of illustration, it will be apparent to those skilled in the art that many of these details may be varied considerably without departing from the spirit and scope of my invention.

I claim:

1. In a bumper and channel combination, a resilient elongated bumper member having a head portion extending along one side thereof and a pair of flexible legs diverging outwardly from said head portion, a channel member having a base wall and converging side walls confining said legs and providing an opening for said head portion, said legs having bottom surfaces normally lying along intersecting planes forming a V, said legs also defining a notch centrally therebetween separating said bottom surfaces, said legs being tapered and terminating at their ends in edges seated within the channel of said channel member at the junctions of said side and base walls, said head portion having lateral dimensions smaller than the width of said channel opening for sliding movement of said head portion inwardly and outwardly therein, said head portion projecting outwardly through said opening and being inwardly movable towards said face wall when said legs are flexed in response to impact forces applied to said head portion.

2. The structure of claim 1 in which said notch is generally V-shaped with the apex thereof extending toward said head, the apex of said V-shaped notch defining an angle more acute than the angle formed by the intersecting planes of said bottom surfaces.

3. In a bumper guard structure, a channel having a base wall and converging side walls defining an opening therebetween, a resilient elongated bumper having a longitudinally extending head portion projecting through said opening and a pair of longitudinally extending and normally spread-apart flexible legs connected to said head, said head having substantially parallel lateral surfaces and having lateral dimensions no greater than the width of said channel opening for sliding movement of said head portion inwardly and outwardly therein, said legs being received by said channel and normally disposed against the inner surfaces of the side walls thereof, said legs also defining a notch centrally therebetween and each leg having an inclined bottom surface extending from said notch to the juncture of said base and one of said side walls thereby forming an acute angle with said base, said head portion being movable through said opening and said legs being compressed within said channel when a force directed toward said base is exerted against said head, thereby reducing the angles formed between said bottom surfaces of said legs and said base.

4. In a bumper structure for trucks and the like, an elongated resilient member having a generally V-shaped cross-section and having a head portion extending along one side thereof and a pair of diverging legs extending rearwardly and outwardly from said head portion, said legs being tapered near the ends thereof and being provided with substantially flat outer surfaces, and a channel having a base and converging side walls adapted to receive the legs of said resilient member for normally engaging the outer surfaces of said legs and for frictionally securing said member in operative position, said side walls defining an opening therebetween, said head portion projecting forwardly through said opening and being forwardly and rearwardly movable therein, the tapered portions of said resilient legs being adapted to flex inwardly and rearwardly in response to a rearwardly directed force exerted against said head portion, said head portion having flat side surfaces and having lateral dimensions less than the width of said channel opening.

5. The structure of claim 4 in which the legs of said V-shaped member may be folded inwardly towards each other for insertion and withdrawal from said channel.

6. A bumper structure adapted to be mounted upon trucks and the like comprising a resilient elongated member having a head portion extending along one side thereof and a pair of diverging flexible legs extending outwardly and rearwardly from said head portion, said legs each having outer, inner end bottom surfaces, a channel member having a base and side walls adapted to receive said legs, said side walls having spaced forward edges defining an opening therebetween, said head portion projecting forwardly through said opening and being rearwardly movable a limited distance therethrough in response to rearwardly directed impact forces applied thereagainst, said bottom surfaces of said legs lying along planes intersecting between said head and said base and forming acute angles with said base, and said inner surfaces of said legs being intermediate of said head and bottom surfaces and lying along intersecting planes forming obtuse angles with the planes of said bottom surfaces, said head portion having flat lateral surfaces and having lateral dimensions less than the width of said channel opening for unobstructed forward and rearward movement of said head portion through said opening, whereby rearward force exerted upon said head portion causes rearward movement of said head portion through said opening until said bottom surfaces of said legs abut said base.

7. The structure of claim 6 in which the side walls of said channel member are adapted to engage normally the outer surfaces of said legs for frictionally securing said resilient member in operative position.

8. The structure of claim 6 in which the legs of said resilient member may be folded inwardly towards each other to bring the inner surfaces of said legs into abutting relation, whereby said folded legs may be inserted and withdrawn from said channel member.

References Cited in the file of this patent

UNITED STATES PATENTS

| | | |
|---|---|---|
| 1,486,660 | Hajdu | Mar. 11, 1924 |
| 1,644,683 | Leipert | Oct. 11, 1927 |
| 1,972,283 | Zimmers | Sept. 4, 1934 |
| 2,054,951 | Saives | Sept. 22, 1936 |
| 2,099,867 | Saives | Nov. 23, 1937 |
| 2,119,429 | Fletcher | May 31, 1938 |
| 2,161,837 | Tell | June 13, 1939 |
| 2,230,333 | Painter | Feb. 4, 1941 |
| 2,330,684 | Colling | Sept. 28, 1943 |

FOREIGN PATENTS

| | | |
|---|---|---|
| 694,056 | Great Britain | July 15, 1953 |

UNITED STATES PATENT OFFICE
CERTIFICATE OF CORRECTION

February 17, 1959

Patent No. 2,873,993

Kurt G. C. Savke

It is hereby certified that error appears in the printed specification of the above numbered patent requiring correction and that the said Letters Patent should read as corrected below.

Column 4, line 51, for "inner end bottom surfaces" read -- inner and bottom surfaces --.

Signed and sealed this 2nd day of June 1959.

(SEAL)
Attest:

KARL H. AXLINE
Attesting Officer

ROBERT C. WATSON
Commissioner of Patents